C. E. BACON.
CARVING MACHINE.
No. 9,269.
Patented Sept. 21, 1852.
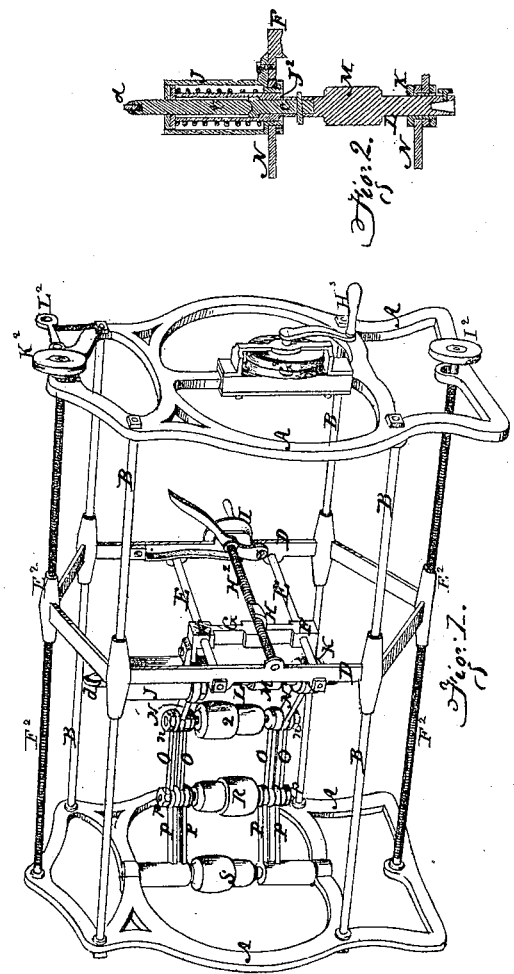

UNITED STATES PATENT OFFICE.

CHARLES E. BACON, OF BUFFALO, NEW YORK.

CARVING-MACHINE.

Specification of Letters Patent No. 9,269, dated September 21, 1852.

*To all whom it may concern:*

Be it known that I, CHARLES E. BACON, of the city of Buffalo, in the county of Erie and State of New York, have invented certain new and useful Improvements in Machines for Cutting and Carving from Original Patterns, of which the following description, illustrated by the accompanying drawings and references, is sufficiently clear and comprehensive to enable others of competent skill to make and use my invention.

The nature of my improvement consists in giving to a vertical or inclined cutter a motion laterally in any direction, at the same time it has a rapid rotary motion for the purpose of producing a facsimile of any pattern or device or for carving or cutting from patterns or originals previously made, or for cutting a pattern or device which shall be the reverse of the original, that is, having projections where there are cavities in the original, and vice versa.

In this arrangement hereafter more particularly described, I place the original pattern or device previously made in the usual way, immediately above the cutter, and extend from the cutter to this pattern a non-revolving pointer which although it does not revolve is attached to the shaft which supports and revolves with the cutter in the manner hereafter specified. This pointer by means of a very small wheel upon its end, traces the curves, cavities, and irregularities of the original pattern and guides the cutter to cut a new pattern which shall be a perfect type of the original or a type which shall be reversed in design as above stated.

Figure 1, is a perspective view of the whole machine for accomplishing the purpose above stated. Fig. 2 is a vertical section of the cylinders J and $J^2$, with thin accompanying parts.

A, A, is an upright cast-iron frame made in the form represented in the drawings or in any suitable form to give strength and steadiness to the machinery, and properly secured to a bed piece or floor timber.

B, B, &c., are cast-iron beams or ways.

The uprights D, D, are connected together by the rods or ways E, E, extending across from side to side, and slide upon these ways B, B, simultaneously either by the power of the screws upon the top and bottom of the frame or by hand as hereafter described.

Upon the ways or rods E, E, are the slides F, F, connected together by the bar G. The half nut H, being bolted to the center of this in the manner shown in drawings. The object of this half nut is to carry the guides or slides F, F, gradually backward and forward upon the ways or rods E, E, by means of the screw $H^2$, and hand wheel I. This same works in bearings one of which is slotted, so that the screw may be raised from the half nut and the slides F, F, moved by the hand in either direction at pleasure. Upon each of these slides are snugs or flanges by which they are bolted, the upper one to the cylinder J to a like flange or lip projecting from this cylinder, and the lower one to the bearing K, of the cutter stock L. This cutter stock or spindle L, has the band wheel M upon it by which it is driven, and is generally but not necessarily set vertically in its bearings which bearings are the centers upon which one end of the bars or arms N, N, turn. The arms N, N, O, O, and P, P, form a folding frame with joints at *n, n,* and *p, p,* the joints in the upper part of the frame corresponding with those in the lower part, as shown in drawings, Fig. 1. Between each two corresponding joints are the double band wheels Q and R, each firmly attached to a shaft which turns in bearings, around which the ends of the arms N, N, O, O, and P, P, form the joints *n, n,* and *p, p,* so that their centers shall correspond and the band wheels be kept at equal distances from each other at whatever position the folding frame may be made to assume. The double band wheel S turns upon the same shaft upon which the one end of the arms P, P, turn, as represented in drawings and receives the power from the engine or other motor by means of a belt, the wheel S, also conveys the power to the double band wheel R by another belt, and R conveys it to Q, and from this it is conveyed to the wheel M, which drives a cutter, secured in the lower end of the cutter stock L.

A greater or less number of pulley band wheels or their equivalents may be used and the stationary band wheel S may be placed in any position desired at either side from that shown in the drawings.

The cutter may be inclined to the folding frame at pleasure by making the arms N stationary with the bearings of the spindle or cutter stock, the stock or spindle being inclined also to a bed piece which supports the material from which the device or pattern is to be cut properly arranged between the ways B (lower ones) and the side framing A. The original pattern or device is usually secured in a suitable manner to the underside of the wood platform supported properly between the upper ways B in which case the device, if carved, will not be a facsimile, for the design although perfect will be exactly the reverse of the original in its features, being depressed where the original is elevated and vice versa. Instead of tracing from the pattern or original design upon the underside of the platform B² as above stated, the design or pattern may be placed upon the top of the platform and may be followed by a tracer brought from under and around the side and over the platform. At this end of the tracer a small wheel rests upon the pattern and so has also the vertical tracer as shown in section in Fig. 2, at $d$, in order to keep this vertical tracer up to the pattern, at the same time giving it perfect liberty to rise and fall with the inequalities in the surface of the original design. The cutter stock and cylinder J are constructed as follows, sectioned in Fig. 2.

J is an outside cylinder with a circular shoulder on the inside near the bottom. Sliding through this outside cylinder is the cylinder J² surrounded by a helical spring which rests upon the shoulder in the outside cylinder and presses upon a circular flange upon the outside of the cylinder J² near its top.

The center point $c$ is confined within the inner cylinder, being put in from the top and followed by the point or stem $t$, which is continued up to the upper platform with a small wheel or its equivalent upon it, to trace the pattern or other device as above specified. The point $t$, has a flange upon it resting upon and secured to the flange upon the top of the inner cylinder. The center pin $c$, is prevented from sliding downward by a shoulder in the inside cylinder similar to that in the outside cylinder, upon which shoulder the head of the center point $c$ rests. This head is made with a cavity in the top for the reception of the point $t$. It is keyed into the top of the cutter stock or shaft L in the manner represented in drawings Fig. 2. This allows the center pin $c$ to revolve freely with the spindle L, where the center or stem $t$ and inside cylinder have only a vertical motion as they are acted upon by the spring and pattern, being prevented from turning by a feather and key seat or channel between the two cylinders, or by other suitable means. The cutter and pulley or band wheel being attached by the spindle to the center $c$, have also the vertical motion with the inside cylinder J² and stem $t$. By means of the sliding frame (moved longitudinally by the half nuts E², E², and the screws F², F², above and below the platform and bed), the folding frame already described may be folded up, and the cutters thus receive a longitudinal motion, as well as lateral motion by the slides F, F. The cutter and folding frame may be detached from the slide F, F, and governed by the hand at will or guided by the screws F², F², above named by turning the double band wheels G².

This double band pulley or wheel G² is hung in bearings which may slide up and down as represented in drawings, Fig. 1, and at the same time be turned by the cranks H². This wheel has a band when in operation extending over each of the wheels I² and K² upon the end of the screws F², F². The bearings of this end of these screws is also slotted so that they may be raised or lowered into the half nuts by means of the lever L² which raises the ends of both screws and the three wheels at the same time.

If it is thought best two sets of horizontal ways may be used instead of those above described. One set of the ways sliding within and at right angles to the other and the cutter stock or spindle hung in a manner similar to the one above specified by the side of the inside ways. In case this method is adopted the screws F², F², may be placed by the side of the outside ways, instead of above and below them, as here represented.

The lower platform or bed may be raised and lowered by a screw upon the underside or by any other suitable means for the purpose of adjusting the pattern to the cutter.

Carving or cutting from almost any device may be performed by this machine either of metal or wood, and it will be accomplished with neatness and despatch. Various kinds of cutters may be used varying according to the kind of work to be performed and the kind of wood or material of which the pattern is constructed.

What I claim as my invention, and desire to secure by Letters Patent, is—

The folding frame and wheels or pulleys, constructed substantially as above described, in combination with the double cross sliding ways, and vertically sliding cylinder or tracer, for the purpose of tracing from patterns or other device in the manner above specified.

CHARLES E. BACON.

Witnesses:
SAML. BISHOP,
JOHN B. FAIRBANKS.